(12) United States Patent
Nagashima et al.

(10) Patent No.: US 12,420,618 B2
(45) Date of Patent: Sep. 23, 2025

(54) GLASS FOR VEHICLES, FRAME MEMBER, AND MANUFACTURING METHOD FOR GLASS FOR VEHICLES

(71) Applicant: AGC Inc., Tokyo (JP)

(72) Inventors: Tatsuo Nagashima, Chiyoda-ku (JP); Hiroshi Yamakawa, Chiyoda-ku (JP); Takafumi Inoue, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 527 days.

(21) Appl. No.: 17/900,912

(22) Filed: Sep. 1, 2022

(65) Prior Publication Data

US 2023/0001772 A1  Jan. 5, 2023

Related U.S. Application Data

(63) Continuation of application No. PCT/JP2021/008413, filed on Mar. 4, 2021.

(30) Foreign Application Priority Data

Mar. 11, 2020 (JP) .................. 2020-042426

(51) Int. Cl.
*B60J 3/00* (2006.01)
*B32B 3/26* (2006.01)
(Continued)

(52) U.S. Cl.
CPC .............. *B60J 3/007* (2013.01); *B32B 3/266* (2013.01); *B32B 17/10036* (2013.01);
(Continued)

(58) Field of Classification Search
CPC ...... H04N 23/90; H04N 13/239; H04N 23/54; H04N 23/56; B60J 1/02; B60J 3/007;
(Continued)

(56) References Cited

U.S. PATENT DOCUMENTS 10,065,581 B2  9/2018  Terada et al.
11,048,024 B2  6/2021  Ikegami et al.
(Continued)

FOREIGN PATENT DOCUMENTS

GB   2 271 139 A   4/1994
JP   10-250498 A   9/1998
(Continued)

OTHER PUBLICATIONS

International Search Report issued May 25. 221 in PCT/JP2021/008413 filed on Mar. 4, 2021, citing documents 15-18 therein, 2 pages.

*Primary Examiner* — Sultan Chowdhury

(74) *Attorney, Agent, or Firm* — Oblon, McClelland, Maier &Neustadt, L.L.P.

(57) ABSTRACT

In glass for vehicles including a light blocking region, a far-infrared ray transmission region is formed in the light blocking region, the far-infrared ray transmission region being provided with an opening and a far-infrared ray transmission member disposed in the opening, and the glass for vehicles and the far-infrared ray transmission member are bonded to each other with a frame member interposed therebetween. Regarding the frame member, where a length of the longest straight line among straight lines each connecting optional two points on an inner circumference on a side facing the opening in a surface on a vehicle exterior side is D, and a thickness of a portion projecting from a surface on the vehicle exterior side of the glass for vehicles is $D^2/t$ is larger than 1250, and t is equal to or smaller than 2.5 mm.

10 Claims, 9 Drawing Sheets

(51) Int. Cl.
*B32B 17/10* (2006.01)
*G02B 5/20* (2006.01)

(52) U.S. Cl.
CPC .. *B32B 17/10293* (2013.01); *B32B 17/10449* (2013.01); *B32B 17/10807* (2013.01); *G02B 5/208* (2013.01); *B32B 2605/006* (2013.01)

(58) Field of Classification Search
CPC . B60J 1/008; C03C 3/078; C03C 4/10; C03C 17/3621; C03C 17/3628; C03C 17/3634; C03C 17/3649; C03C 2217/268; C03C 2217/285; C03C 2217/288; C03C 2217/73; C03C 2218/15; C03C 17/22; C03C 17/28; C03C 17/3411; C03C 27/10; C03C 2217/734; C03C 3/323; C03C 17/04; C03C 17/32; B60R 11/04; B60R 2011/0026; B60R 13/04; B60R 1/00; B60R 2300/106; G02B 1/115; G02B 1/14; G02B 5/208; B32B 17/10449; B32B 17/10036; B32B 17/10348; B32B 17/10807; B32B 17/10293
See application file for complete search history.

(56) References Cited

U.S. PATENT DOCUMENTS

| | | |
|---|---|---|
| 2003/0169491 A1 | 9/2003 | Bender et al. |
| 2016/0332425 A1* | 11/2016 | Yamaguchi ....... B32B 17/10036 |
| 2017/0341491 A1* | 11/2017 | Nakagawa .............. C03C 17/04 |
| 2019/0105879 A1* | 4/2019 | Aoki ..................... B32B 27/306 |

FOREIGN PATENT DOCUMENTS

| | | |
|---|---|---|
| JP | 2017-081520 A | 5/2017 |
| JP | 2017-149185 A | 8/2017 |
| JP | 2017-194489 A | 10/2017 |

* cited by examiner

GLASS FOR VEHICLES, FRAME MEMBER, AND MANUFACTURING METHOD FOR GLASS FOR VEHICLES

CROSS-REFERENCE TO RELATED APPLICATION(S)

This application is a continuation of International Application No. PCT/JP2021/008413, filed on Mar. 4, 2021, the entire contents of which are incorporated herein by reference.

FIELD

The present invention relates to glass for vehicles, a frame member, and a manufacturing method for the glass for vehicles.

BACKGROUND

In recent years, various sensors may be mounted for the purpose of improving safety of an automobile. Examples of the sensor mounted on the automobile include a camera, Light Detecting and Ranging (LiDAR), a millimetric wave radar, an infrared sensor, or the like.

Infrared rays are classified into near-infrared (for example, a wavelength of 0.7 µm to 2 µm), mid-infrared (for example, a wavelength of 3 µm to 5 µm), and far-infrared (for example, a wavelength of 8 µm to 13 µm) depending on a wavelength band thereof. Examples of the infrared sensor for detecting such infrared rays include a touch sensor, a near-infrared camera, or a LiDAR for near-infrared, gas analysis or mid-infrared spectroscopic analysis (functional group analysis) for mid-infrared, night vision or a thermo-viewer (hereinafter, referred to as a far-infrared camera) for far-infrared, and the like.

Normally, window glass of an automobile does not transmit far-infrared rays having a wavelength from 8 µm to 13 µm, so that a far-infrared camera is conventionally installed outside a compartment, more specifically, on a front grill in many cases as in Patent Literature 1, for example. However, in a case of installing the far-infrared camera outside the compartment, a structure becomes more complicated to secure ruggedness, water resistance, dustproof properties, and the like, which results in high cost. By installing the far-infrared camera within the compartment, specifically, in an operation area of wipers, the far-infrared camera is protected by the window glass, and dirt or the like can be wiped off, so that the problem as described above can be solved. However, as described above, there is the problem that the window glass does not transmit far-infrared rays, so that the far-infrared camera has not been disposed within the compartment normally.

To meet the demand described above, Patent Literature 2 discloses a window member in which a through hole is made on part of the window glass and an infrared-ray transmissive member is filled in the through hole.

CITATION LIST

Patent Literature

Patent Literature 1: U.S. Patent Application Laid-open No. 2003/0169491
Patent Literature 2: U.K. Patent Application Laid-open No. 2271139

SUMMARY

Technical Problem

In a case of making a through hole on window glass and filling the through hole with an infrared-ray transmissive member as in Patent Literature 2, a frame member having a sealing property may be interposed between the through hole of the window glass and the infrared-ray transmissive member for the purpose of shock resistance, soil resistance, sound insulation, protection for a bonding agent from an external environment, and the like. However, in a case of disposing the frame member, the frame member may project from a surface on a vehicle exterior side of the window glass. In a case in which the frame member projects from the surface on the vehicle exterior side of the window glass, a wiping property of the wipers for the window glass may be deteriorated, or a load on the wipers may be increased.

The present invention is made in view of such a situation, and an object thereof is to provide glass for vehicles, a frame member, and a manufacturing method for the glass for vehicles that can suppress deterioration in the wiping property of the wipers and increase in the load on the wipers.

Solution to Problem

To solve the problem above, a glass for vehicle of the present disclosure comprises a glass base body and including a light blocking region, wherein a far-infrared ray transmission region is formed in the light blocking region, the far-infrared ray transmission region being provided with an opening formed on the glass base body and a far-infrared ray transmission member disposed in the opening, the glass base body and the far-infrared ray transmission member are bonded to each other with a frame member interposed therebetween, and, regarding the frame member, where a length of a longest straight line among straight lines each connecting optional two points on an inner circumference on a side facing the opening in a surface on a vehicle exterior side is D, and a thickness of a portion projecting from a surface on a vehicle exterior side of the glass base body is t, $D^2/t$ is larger than 1250 and t is equal to or smaller than 2.5 mm.

To solve the problem above, a frame member of the present disclosure is configured to bond a far-infrared ray transmission member disposed in an opening formed on a glass base body of glass for vehicles to the glass base body, the frame member comprises a first holding part; a second holding part that is disposed to be continuous to the first holding part, and has an inner diameter smaller than an inner diameter of the first holding part; and a flange part disposed on the first holding part on a side opposite to a side on which the second holding part is disposed, wherein, where a length of a longest straight line among straight lines each connecting optional two points on an inner circumference of the flange part is D, and a thickness of the flange part is t, $D^2/t$ is larger than 1250 and t is equal to or smaller than 2.5 mm.

To solve the problem above, a manufacturing method of the present disclosure is for the glass for vehicles, the manufacturing method comprises: bonding two glass base bodies to each other with an intermediate layer interposed therebetween to be laminated glass including the opening passing through the laminated glass in a thickness direction; assembling the frame member to a peripheral part of the far-infrared ray transmission member; and disposing the far-infrared ray transmission member to which the frame member is assembled in the opening.

Advantageous Effects of Invention

According to the present invention, it is possible to suppress deterioration in the wiping property of the wipers and increase in the load on the wipers.

DESCRIPTION OF EMBODIMENTS

The following describes a preferred embodiment of the present invention in detail with reference to the attached drawings. The present invention is not limited to the embodiment, and in a case in which there are a plurality of embodiments, the embodiments may be combined with each other. Numerical values encompass rounded numerical values.

First Embodiment (Vehicle)

Figure 1:
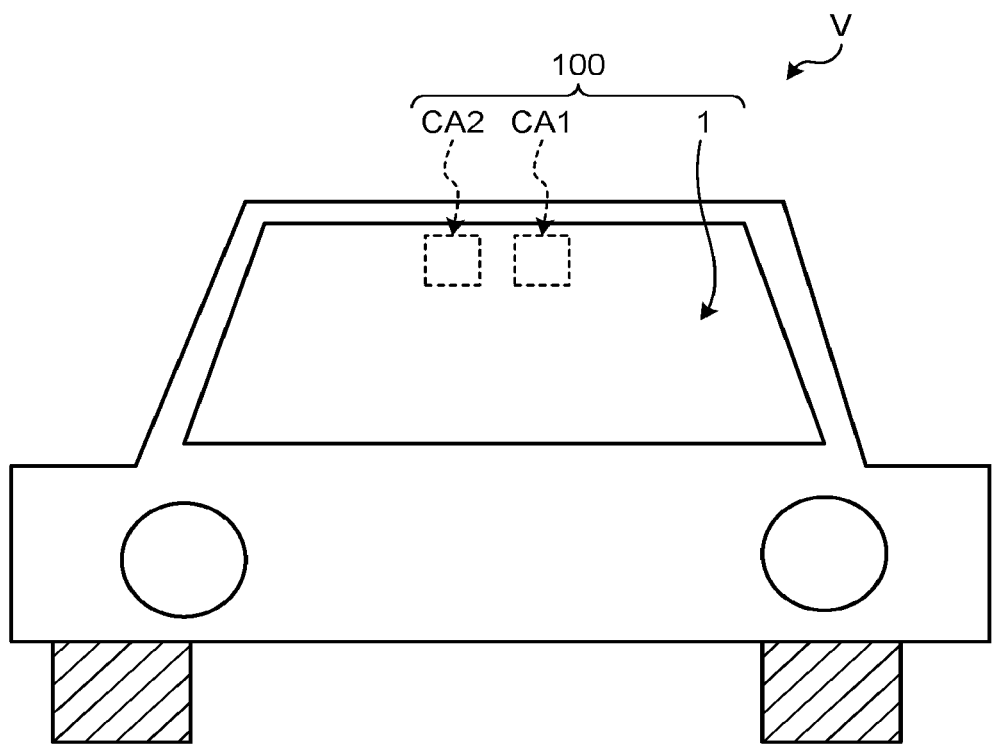
FIG. 1 is a schematic diagram illustrating a state in which glass for vehicles according to a first embodiment is mounted on a vehicle.

FIG. 1 is a schematic diagram illustrating a state in which glass 1 for vehicles according to a first embodiment is mounted on a vehicle V. As illustrated in FIG. 1, the glass 1 for vehicles according to the first embodiment is mounted on the vehicle V. The glass 1 for vehicles is a window member applied to a windshield of the vehicle V. That is, the glass 1 for vehicles is used as a front window of the vehicle V, in other words, wind shield glass. A far-infrared camera CA1 and a visible light camera CA2 are mounted inside the vehicle V (within the vehicle). The inside of the vehicle V (within the vehicle) indicates the inside of a compartment in which a driver's seat of a driver is disposed, for example.

The glass 1 for vehicles, the far-infrared camera CA1, and the visible light camera CA2 constitute a camera unit 100 according to the first embodiment. The far-infrared camera CA1 is a camera that detects far-infrared rays. The far-infrared camera CA1 takes a thermal image of the outside of the vehicle V by detecting far-infrared rays from the outside of the vehicle V. The visible light camera CA2 is a camera that detects visible light. The visible light camera CA2 takes an image of the outside of the vehicle V by detecting visible light from the outside of the vehicle V. The camera unit 100 may further include Light Detection And Ranging (LiDAR) or a millimetric wave radar, for example, in addition to the far-infrared camera CA1 and the visible light camera CA2. Herein, the far-infrared ray is an electromagnetic wave in a wavelength band having a wavelength equal to or larger than 8 μm and equal to or smaller than 13 μm, for example, and the visible light is an electromagnetic wave in a wavelength band having a wavelength equal to or larger than 360 nm and equal to or smaller than 830 nm, for example.

(Glass for Vehicles)

Figure 2:
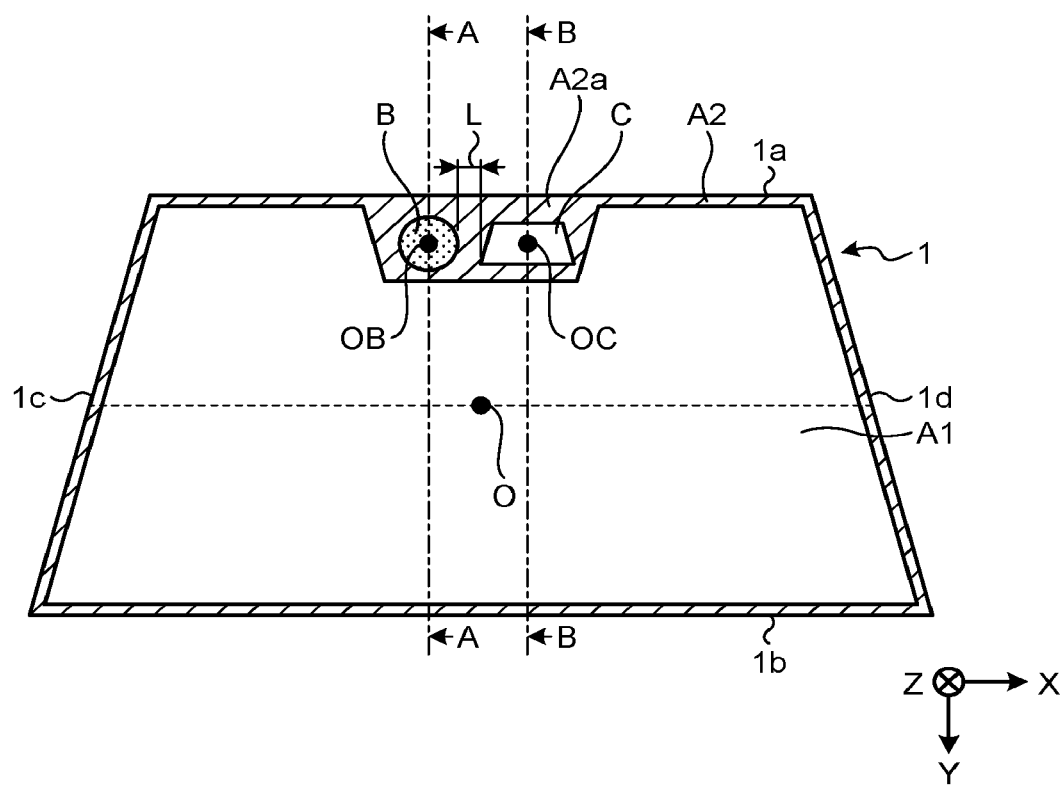
FIG. 2 is a schematic plan view of the glass for vehicles according to the first embodiment.
Figure 3:
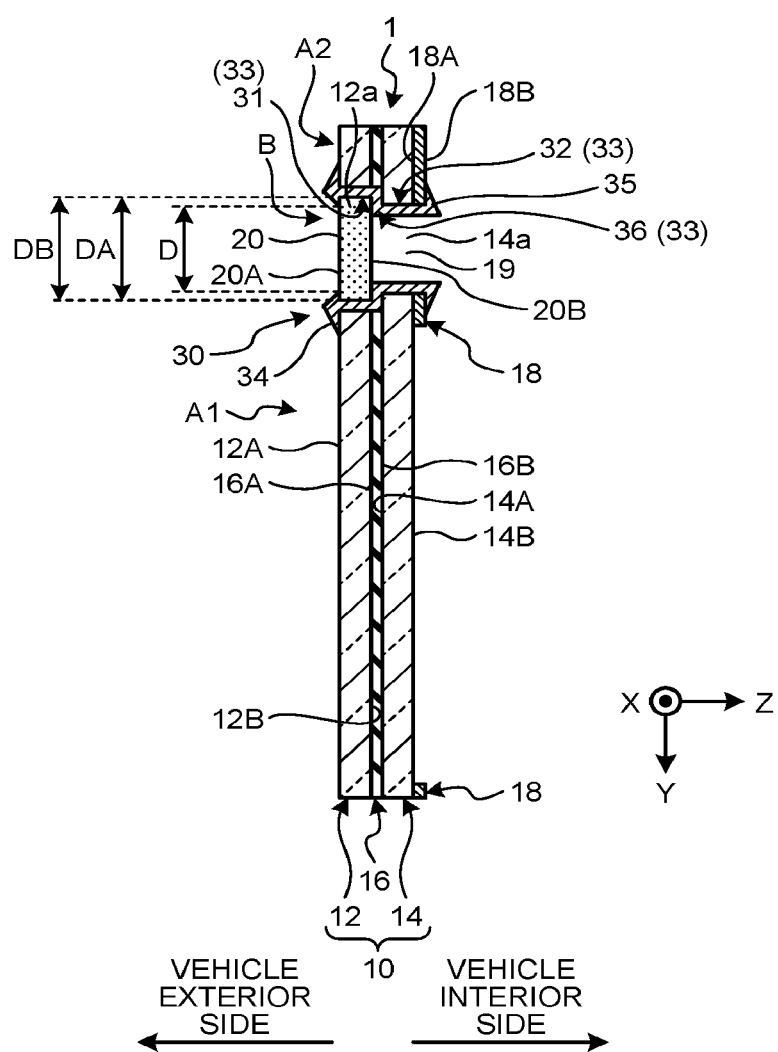
FIG. 3 is a cross-sectional view along the line A-A in FIG. 2.
Figure 4:
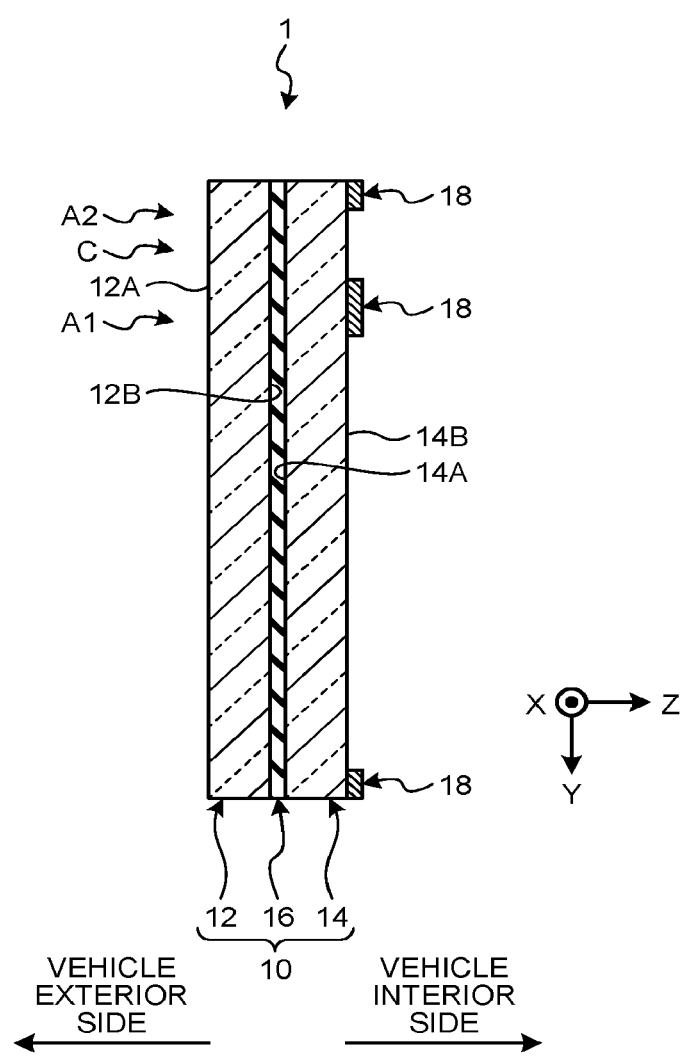
FIG. 4 is a cross-sectional view along the B-B cross section in FIG. 2.

FIG. 2 is a schematic plan view of the glass 1 for vehicles according to the first embodiment. FIG. 3 is a cross-sectional view along the line A-A in FIG. 2. FIG. 4 is a cross-sectional view along the B-B cross section in FIG. 2. As illustrated in FIG. 2, an upper edge of the glass 1 for vehicles is assumed to be an upper edge part 1a, a lower edge thereof is assumed to be a lower edge part 1b, one side edge is assumed to be a side edge part 1c, and the other side edge is assumed to be a side edge part 1d hereinafter. The upper edge part 1a is an edge portion that is positioned on an upper side in a vertical direction when the glass 1 for vehicles is mounted on the vehicle V. The lower edge part 1b is an edge portion that is positioned on a lower side in the vertical direction when the glass 1 for vehicles is mounted on the vehicle V. The side edge part 1c is an edge portion that is positioned on one lateral side when the glass 1 for vehicles is mounted on the vehicle V. The side edge part 1d is an edge portion that is positioned on the other lateral side when the glass 1 for vehicles is mounted on the vehicle V.

Hereinafter, among directions parallel to a surface of the glass 1 for vehicles, a direction from the upper edge part 1a toward the lower edge part 1b is assumed to be a Y-direction (first direction), and a direction from the side edge part 1c toward the side edge part 1d is assumed to be an X-direction. The X-direction is orthogonal to the Y-direction in the present embodiment. A direction orthogonal to the surface of the glass 1 for vehicles, that is, a thickness direction of the glass 1 for vehicles is assumed to be a Z-direction. The Z-direction is, for example, a direction from a vehicle exterior side toward a vehicle interior side of the vehicle V when the glass 1 for vehicles is mounted on the vehicle V. The X-direction and the Y-direction run along the surface of the glass 1 for vehicles. However, in a case in which the surface of the glass 1 for vehicles is a curved surface, for example, the X-direction and the Y-direction may be directions being in contact with the surface of the glass 1 for vehicles at a center point O of the glass 1 for vehicles. The center point O is a center position of the glass 1 for vehicles in a case of viewing the glass 1 for vehicles from the Z-direction.

A transparent region A1 and a light blocking region A2 are formed on the glass 1 for vehicles. The transparent region A1 is a region occupying a center portion of the glass 1 for vehicles when viewed from the Z-direction. The transparent region A1 is a region for securing a visual field of the driver. The transparent region A1 is a region that transmits visible light. The light blocking region A2 is a region formed in the periphery of the transparent region A1 when viewed from the Z-direction. The light blocking region A2 is a region that blocks visible light. In the light blocking region A2, a far-infrared ray transmission region B and a visible light transmission region C are formed within a light blocking region A2a as a portion on the upper edge part 1a side.

The far-infrared ray transmission region B is a region that transmits far-infrared rays, and is a region in which the far-infrared camera CA1 is disposed. That is, the far-infrared camera CA1 is disposed at a position overlapping the far-infrared ray transmission region B when viewed from an optical axis direction of the far-infrared camera CA1. The visible light transmission region C is a region that transmits visible light, and is a region in which the visible light camera CA2 is disposed. That is, the visible light camera CA2 is disposed at a position overlapping the visible light transmission region C when viewed from an optical axis direction of the visible light camera CA2.

In this way, the far-infrared ray transmission region B and the visible light transmission region C are formed in the light blocking region A2. The light blocking region A2 blocks far-infrared rays in a region other than a region in which the far-infrared ray transmission region B is formed, and blocks visible light in a region other than a region in which the visible light transmission region C is formed. The light blocking region A2a is formed in the periphery of the far-infrared ray transmission region B and the visible light transmission region C. As the light blocking region A2a is disposed in the periphery, various sensors are preferably protected from sunlight. This configuration prevents wiring of various sensors from being viewed from the outside of the vehicle, so that the configuration is preferable also in view of design. Detailed description about the far-infrared ray transmission region B and the visible light transmission region C will be described later.

As illustrated in FIG. 3, the glass 1 for vehicles includes a glass base body 12 (first glass base body), a glass base body 14 (second glass base body), an intermediate layer 16, and a light blocking layer 18. In the glass 1 for vehicles, the glass base body 12, the intermediate layer 16, the glass base body 14, and the light blocking layer 18 are laminated in this order in the Z-direction. The glass base body 12 and the glass base body 14 are fixed (bonded) to each other with the intermediate layer 16 interposed therebetween.

As the glass base bodies 12 and 14, for example, soda-lime glass, borosilicate glass, aluminosilicate glass, or the like may be used. The intermediate layer 16 is a bonding layer that bonds the glass base body 12 to the glass base body 14. As the intermediate layer 16, for example, a polyvinyl butyral (hereinafter, also referred to as PVB) modified material, an ethylene-vinyl acetate copolymer (EVA) based material, a urethane resin material, a vinyl chloride resin material, or the like can be used. More specifically, the glass base body 12 includes one surface 12A and another surface 12B, and the other surface 12B is in contact with one surface 16A of the intermediate layer 16 to be fixed (bonded) to the intermediate layer 16. The glass base body 14 includes one surface 14A and another surface 14B, and the one surface 14A is in contact with another surface 16B of the intermediate layer 16 to be fixed (bonded) to the intermediate layer 16. As described above, the glass 1 for vehicles is laminated glass in which the glass base body 12 and the glass base body 14 are laminated. However, the glass 1 for vehicles is not limited to the laminated glass, and may include only one of the glass base body 12 and the glass base body 14, for example. In this case, the intermediate layer 16 is not required to be disposed. Hereinafter, in a case of not distinguishing between the glass base bodies 12 and 14, they are referred to as a glass base body 10.

The light blocking layer 18 includes one surface 18A and another surface 18B, and the one surface 18A is in contact with the other surface 14B of the glass base body 14 to be fixed. The light blocking layer 18 is a layer that blocks visible light. As the light blocking layer 18, for example, a ceramics light blocking layer or a light blocking film can be used. As the ceramics light blocking layer, for example, a ceramics layer made of a conventionally known material such as a black ceramics layer can be used. As the light blocking film, for example, a light blocking polyethylene terephthalate (PET) film, a light blocking polyethylene naphthalate (PEN) film, a light blocking polymethyl methacrylate (PMMA) film, or the like can be used.

In the present embodiment, in the glass 1 for vehicles, a side on which the light blocking layer 18 is disposed is an inner side of the vehicle V (vehicle interior side), and the glass base body 12 is disposed on an outer side of the vehicle V (vehicle exterior side). However, the embodiment is not limited thereto, and the light blocking layer 18 may be disposed on the outer side of the vehicle V. In a case in which the glass 1 for vehicles is configured by the laminated glass of the glass base bodies 12 and 14, the light blocking layer 18 may be formed between the glass base body 12 and the glass base body 14.

The light blocking region A2 is formed by disposing the light blocking layer 18 on the glass base body 10. That is, the light blocking region A2 is a region in which the glass base body 10 includes the light blocking layer 18. That is, the light blocking region A2 is a region in which the glass base body 12, the intermediate layer 16, the glass base body 14, and the light blocking layer 18 are laminated. On the other hand, the transparent region A1 is a region in which the glass base body 10 does not include the light blocking layer 18. That is, the transparent region A1 is a region in which the glass base body 12, the intermediate layer 16, and the glass base body 14 are laminated, but the light blocking layer 18 is not laminated.

As illustrated in FIG. 4, the visible light transmission region C is a region in which the glass base body 10 does not include the light blocking layer 18 in the Z-direction similarly to the transparent region A1. That is, the visible light transmission region C is a region in which the glass base body 12, the intermediate layer 16, and the glass base body 14 are laminated, but the light blocking layer 18 is not laminated.

(Far-Infrared Ray Transmission Member)

Figure 5:
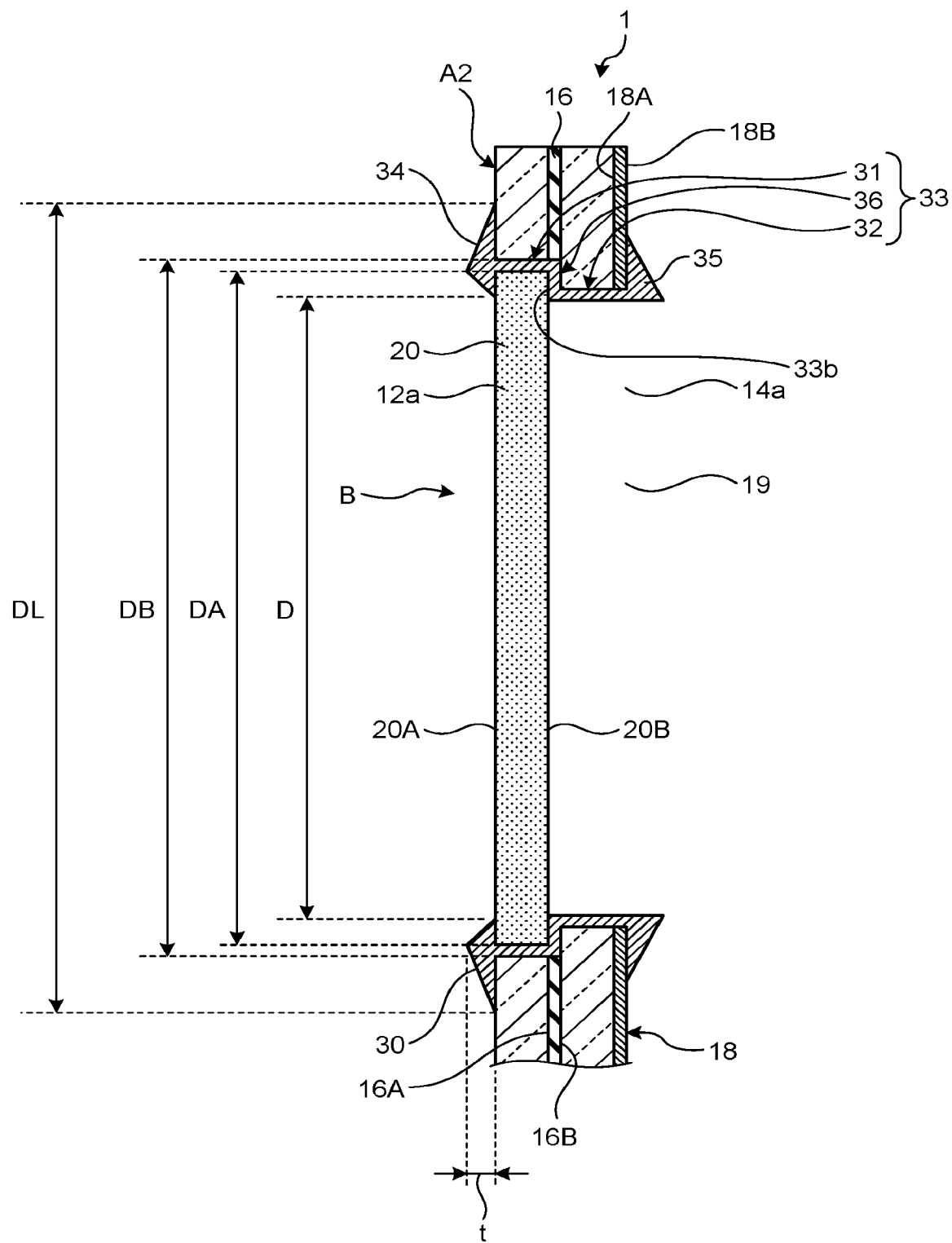
FIG. 5 is an enlarged cross-sectional view of the periphery of a far-infrared ray transmission region of the glass for vehicles.

FIG. 5 is an enlarged cross-sectional view of the periphery of the far-infrared ray transmission region B of the glass 1 for vehicles. As illustrated in FIG. 3 and FIG. 5, an opening 19 is formed on the glass 1 for vehicles, the opening 19 passing through one surface (the surface 12A herein) and the other surface (the surface 14B herein) in the Z-direction. A far-infrared ray transmission member 20 is disposed in the opening 19, the far-infrared ray transmission member 20 including a frame member 30 disposed on a peripheral part thereof. A region in which the opening 19 is formed and the far-infrared ray transmission member 20 is disposed is the far-infrared ray transmission region B. That is, the far-infrared ray transmission region B is the region in which the opening 19 and the far-infrared ray transmission member 20 arranged in the opening 19 are disposed. The light blocking layer 18 is not disposed in the far-infrared ray transmission region B. That is, in the far-infrared ray transmission region B, the glass base body 12, the intermediate layer 16, the glass base body 14, and the light blocking layer 18 are not disposed, and the far-infrared ray transmission member 20 is disposed in the opening 19 formed therein.

Regarding the far-infrared ray transmission member 20, an average transmittance of far-infrared rays having a wavelength from 8 to 13 μm is preferably equal to or larger than 25%, more preferably equal to or larger than 40%, even more preferably equal to or larger than 50%, yet more preferably equal to or larger than 70%, and particularly preferably equal to or larger than 85%. Additionally, regarding the far-infrared ray transmission member 20, the average transmittance of far-infrared rays having a wavelength from 8 to 13 μm is preferably equal to or smaller than 100%. To improve the average transmittance of far-infrared rays to be equal to or larger than 85%, an antireflection film is preferably disposed. When the average transmittance of far-infrared rays falls within this numerical range, far-infrared rays can be appropriately transmitted, and performance of the far-infrared camera CA1 can be sufficiently exhibited.

A material of the far-infrared ray transmission member 20 is not particularly limited, and examples thereof include ZnS, Ge, Si, or chalcogenide glass.

Preferred composition of the chalcogenide glass contains, in atomic percentage,
Ge+Ga; 7% to 25%,
Sb; 0% to 35%,
Bi; 0% to 20%,
Zn; 0% to 20%,
Sn; 0% to 20%,
Si; 0% to 20%,
La; 0% to 20%,
S+Se+Te; 55% to 80%,
Ti; 0.005% to 0.3%,
Li+Na+K+Cs; 0% to 20%, and
F+Cl+Br+I; 0% to 20%. Additionally, this glass preferably has a glass transition point (Tg) of 140° C. to 550° C.

In this way, the far-infrared ray transmission member 20 is attached to the opening 19 with the frame member 30 interposed therebetween as described later. A surface on the vehicle exterior side of the far-infrared ray transmission member 20 is preferably formed to be flush with (continuous to) a surface on the vehicle exterior side of the light blocking region A2. In other words, the surface 20A on the vehicle exterior side of the far-infrared ray transmission member 20 is attached to be continuous to the surface 12A of the glass base body 12. In this way, when the surface 20A of the far-infrared ray transmission member 20 is continuous to the surface 12A of the glass base body 12, a wiping effect of the wipers can be prevented from being deteriorated. Furthermore, it is possible to prevent the design of the vehicle V from being deteriorated due to a level difference, and prevent dust and the like from accumulating on the level difference. Additionally, the far-infrared ray transmission member 20 is preferably shaped in accordance with a curved surface shape of the glass 1 for vehicles to be applied. A method of shaping the far-infrared ray transmission member 20 is not particularly limited, but polishing or mold molding is selected in accordance with the curved surface shape or a member.

Coating may be applied to the surface on the vehicle exterior side or the surface on the vehicle interior side of the far-infrared ray transmission member 20. For example, an antireflection film may be provided on the surface on the vehicle exterior side (surface 20A). The antireflection film is preferably an antireflection film including 3 to 12 layers. A material thereof is not particularly limited, but is preferably Ge, Si, ZnS, ZnSe, $As_2S_3$, $As_2Se_3$, metal oxide ($Al_2O_3$, $Bi_2O_3$, $CeO_2$, CuO, $HfO_2$, MgO, SiO, $SiO_2$, TiO, $TiO_2$, $Ti_2O_3$, $Y_2O_3$, $ZrO_2$), carbon hydride, diamond-like carbon (DLC), or metal fluoride ($MgF_2$, $CaF_2$, $SrF_2$, $BaF_2$, $PbF_2$, $LaF_3$, $YF_3$). A layer closest to the vehicle exterior side of the antireflection film is preferably a film having Mohs hardness equal to or larger than 7 and high transmittance of far-infrared rays in view of scratch resistance. A layer closest to the vehicle exterior side of the antireflection film is particularly preferably a diamond-like carbon film.

The shape of the far-infrared ray transmission member 20 is not particularly limited, but may be preferably a plate shape matching the shape of the opening 19. That is, in a case in which the opening 19 has a circular shape, for example, the far-infrared ray transmission member 20 may have a disc shape (cylinder shape). In view of design, a surface shape of the far-infrared ray transmission member 20 on the vehicle exterior side may be processed to match a curvature of an outer surface shape of the glass base body 12. Additionally, to achieve both of widening of a viewing angle of the far-infrared camera CA1 and improvement of mechanical characteristics, for example, the far-infrared ray transmission member 20 may be caused to have a lens shape. Such a configuration is preferable because far-infrared light can be efficiently collected even if the area of the far-infrared ray transmission member 20 is small. In this case, the number of far-infrared ray transmission members 20 having a lens shape is preferably 1 to 3, and typically preferably 2. Furthermore, it is particularly preferable that the far-infrared ray transmission member 20 having a lens shape is aligned and modularized in advance, and integrated with a housing for bonding the far-infrared camera CA1 to the glass 1 for vehicles, or a bracket.

The glass 1 for vehicles according to the present embodiment is preferably configured such that an area of the opening 19 on the surface on the vehicle interior side is smaller than an area of the opening 19 on the surface on the vehicle exterior side. And accordingly, an area on the surface on the vehicle interior side of the far-infrared ray transmission member 20 is preferably smaller than an area on the surface on the vehicle exterior side thereof. Such a configuration improves strength against impact from the vehicle exterior side. More specifically, in a case in which the glass 1 for vehicles according to the present embodiment is laminated glass including the glass base body 12 (vehicle exterior side) and the glass base body 14 (vehicle interior side), the opening 19 is formed by an opening 12a of the glass base body 12 and an opening 14a of the glass base body 14 overlapping each other. In this case, an area of the opening 12a of the glass base body 12 may be caused to be larger than an area of the opening 14a of the glass base body 14, and the far-infrared ray transmission member 20 matching the size of the opening 12a of the glass base body 12 may be arranged in the opening 12a of the glass base body 12.

In view of strength, the thickness of the far-infrared ray transmission member 20 is preferably equal to or larger than 1.5 mm, more preferably equal to or larger than 2.0 mm, and yet more preferably equal to or larger than 3.0 mm. An upper limit of the thickness of the far-infrared ray transmission member 20 is not particularly limited, but is normally equal to or smaller than 5.0 mm. Herein, the thickness means a length of the far-infrared ray transmission member 20 in the Z-direction.

(Frame Member)

Figure 6:
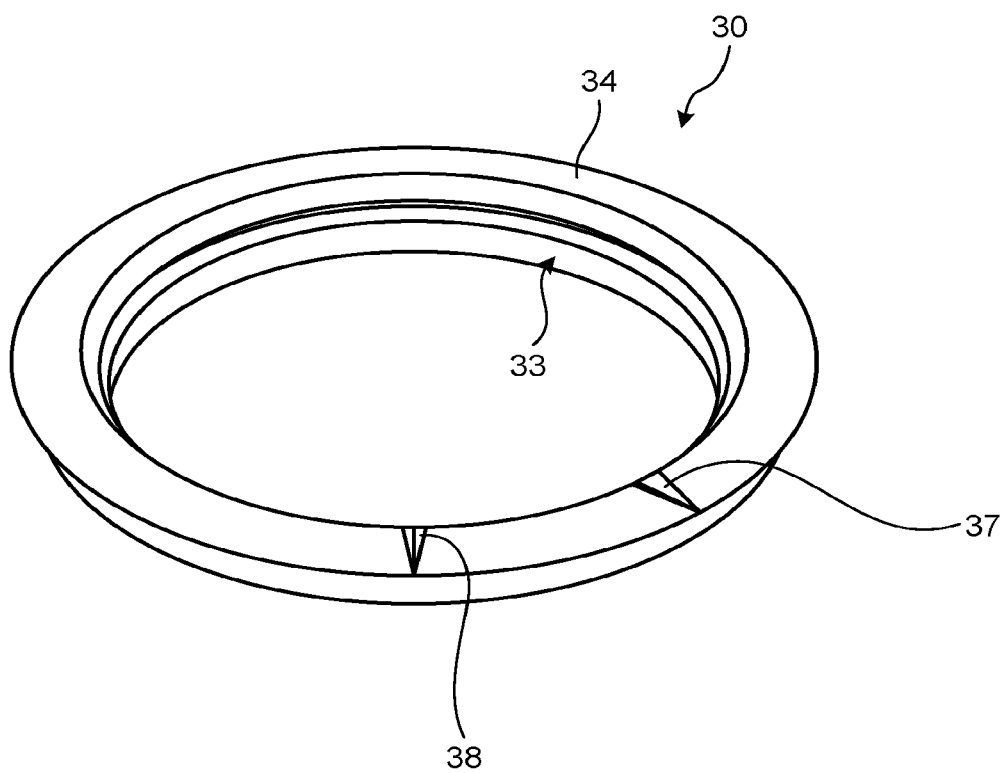
FIG. 6 is a perspective view of a frame member of the glass for vehicles.
Figure 7:
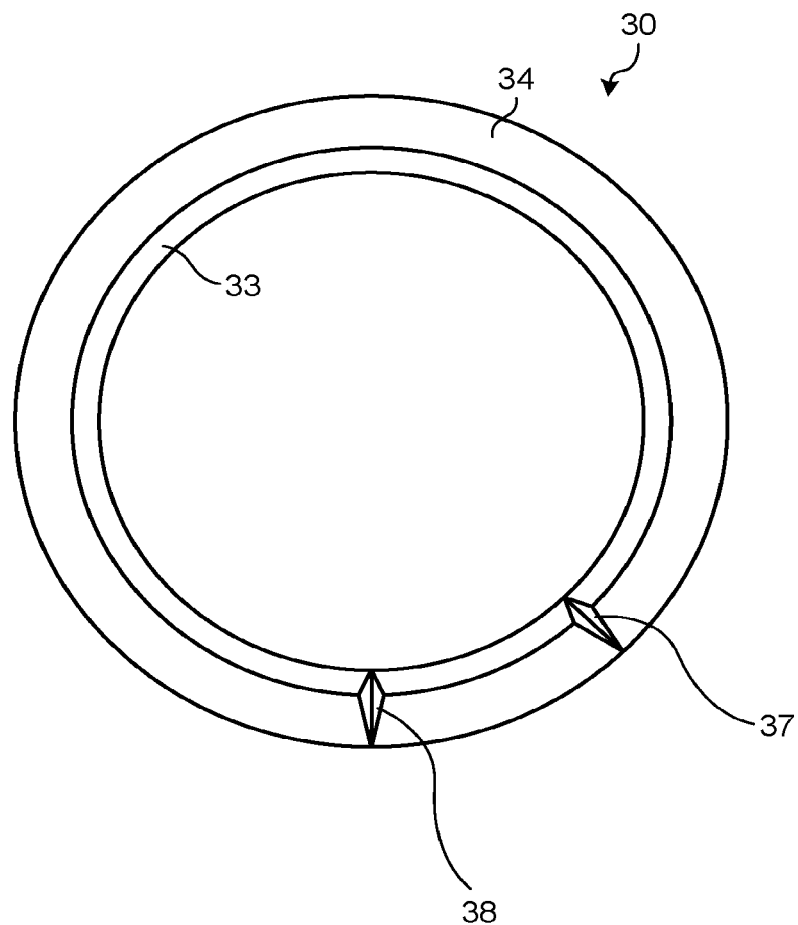
FIG. 7 is a front view of the frame member of the glass for vehicles.
Figure 8:
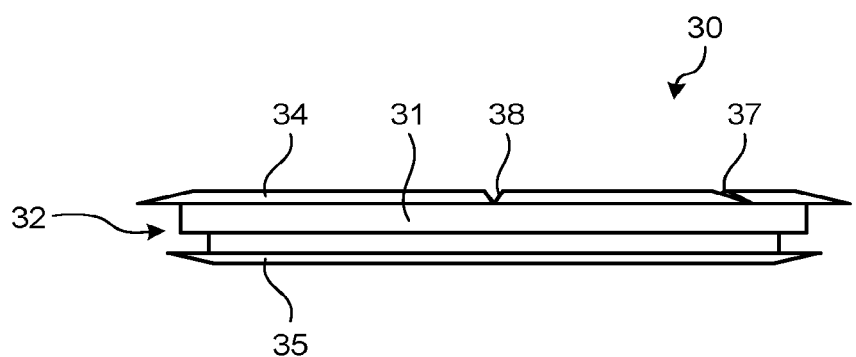
FIG. 8 is a side view of the frame member of the glass for vehicles.
Figure 9:
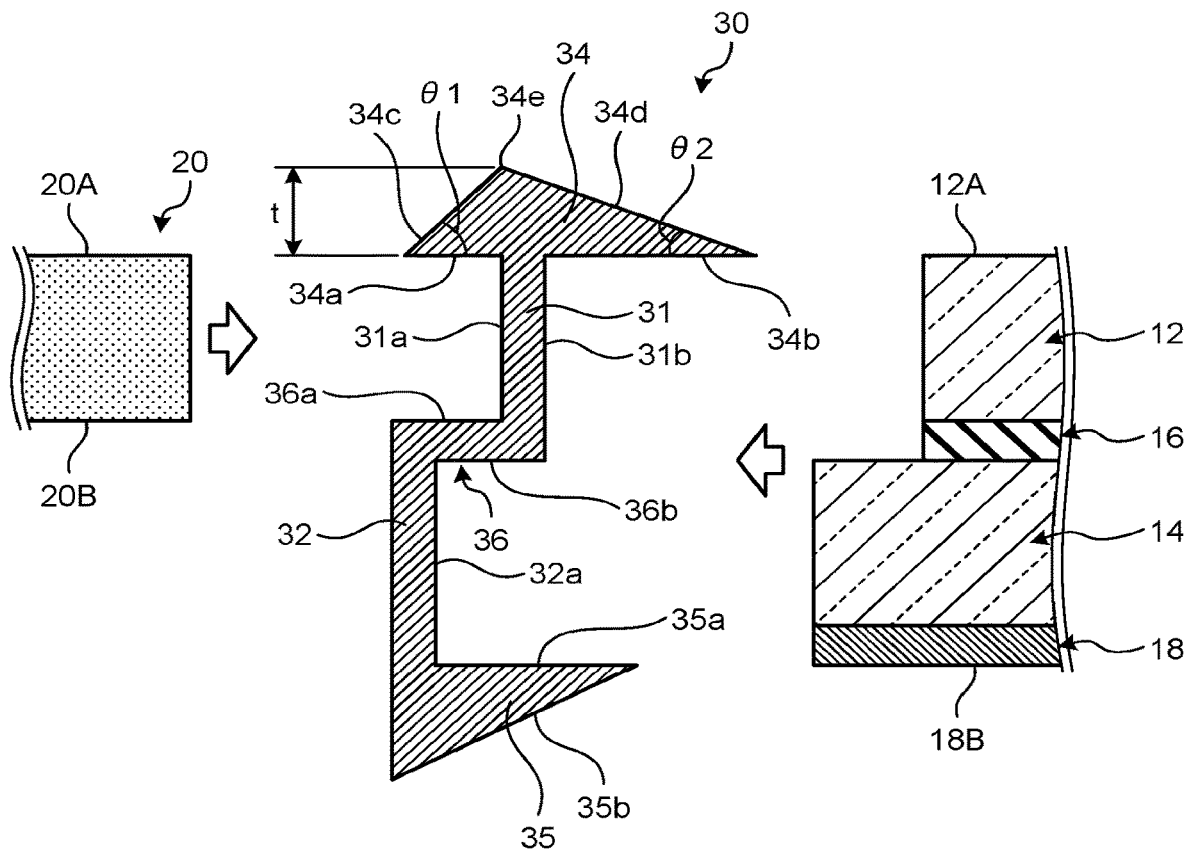
FIG. 9 is a cross-sectional view of the frame member of the glass for vehicles.

FIG. 6 is a perspective view of the frame member 30 of the glass 1 for vehicles. FIG. 7 is a front view of the frame member 30 of the glass 1 for vehicles. FIG. 8 is a side view of the frame member 30 of the glass 1 for vehicles. FIG. 9 is a cross-sectional view of the frame member 30 of the glass 1 for vehicles. The frame member 30 is interposed between the far-infrared ray transmission member 20 and the glass base body 10, and functions as a sealing material. The frame member 30 is disposed between an inner peripheral surface of the opening 19 of the glass base body 10 and the far-infrared ray transmission member 20. The shape of the frame member 30 is not particularly limited. However, the frame member 30 is formed in a cylindrical shape in a case in which the far-infrared ray transmission member 20 has a disc shape, and disposed on a peripheral part of the far-infrared ray transmission member 20. The frame member 30 includes a cylindrical part 33 disposed between the far-infrared ray transmission member 20 and the glass base body 10, a first flange part 34 (flange part) formed on the vehicle exterior side with respect to the cylindrical part 33, and a second flange part 35 formed on the vehicle interior side with respect to the cylindrical part 33. The cylindrical part 33 includes a first holding part 31 that holds the far-infrared ray transmission member 20, a second holding part 32 that is formed closer to the vehicle interior side than the first holding part 31 and holds the glass base body 10, and a wall part 36 that connects the first holding part 31 to the second holding part 32. In the present embodiment, the cylindrical part 33 is formed in a cylindrical shape that covers the peripheral part of the far-infrared ray transmission member 20.

An inner diameter of the second holding part 32 is formed to be smaller than an inner diameter of the first holding part 31, so that the cylindrical part 33 is formed in a stepped shape such that the inner diameter on the vehicle interior side is smaller than that on the vehicle exterior side. As illustrated in FIG. 9, the first holding part 31 of the cylindrical part 33 is a cylindrical member extending in the Z-direction. The wall part 36 is a disc-shaped member extending radially inward from a peripheral part on the vehicle interior side of the first holding part 31. The second holding part 32 is a cylindrical member extending from a peripheral part on a radially inward of the wall part 36 in the Z-direction. The first flange part 34 is disposed on the peripheral part on the vehicle exterior side of the first holding part 31. The first flange part 34 extends radially inward and radially outward with respect to the first holding part 31. The first flange part 34 is a portion that covers a boundary between the far-infrared ray transmission member 20 and the glass base body 10, and projects toward the vehicle exterior side from the far-infrared ray transmission member 20 and the glass base body 10 when the frame member 30 is attached to the glass 1 for vehicles. The second flange part 35 is disposed on a peripheral part on the vehicle interior side of the second holding part 32. The second flange part 35 is a portion that projects toward the vehicle interior side from the far-infrared ray transmission member 20 and the glass base body 10 when the frame member 30 is attached to the glass 1 for vehicles. The second flange part 35 extends radially outward with respect to the second holding part 32.

As illustrated in FIG. 9, an inner peripheral surface 31a of the first holding part 31 is bonded to a peripheral part (outer peripheral surface) of the far-infrared ray transmission member 20. A surface 34a on the vehicle interior side of a portion projecting radially inward of the first flange part 34 is bonded to the surface 20A on the vehicle exterior side of the far-infrared ray transmission member 20. A surface 36a on the vehicle exterior side of the wall part 36 is bonded to a surface 20B on the vehicle interior side of the far-infrared ray transmission member 20. That is, the frame member 30 is fixed to the far-infrared ray transmission member 20 with the inner peripheral surface 31a, the surface 34a, and the surface 36a. More specifically, a bonding agent is applied to the inner peripheral surface 31a, the surface 34a, and the surface 36a to hold the far-infrared ray transmission member 20. An outer peripheral surface 31b of the first holding part 31 is bonded to an inner peripheral surface of the opening 12a of the glass base body 12. A surface 34b on the vehicle interior side of a portion projecting radially outward of the first flange part 34 is bonded to the surface 12A on the vehicle exterior side of the glass base body 12. A surface 36b on the vehicle interior side of the wall part 36 is bonded to the surface 14A on the vehicle exterior side of a peripheral part of the opening 14a of the glass base body 14. An outer peripheral surface 32a of the second holding part 32 is bonded to an inner peripheral surface of the opening 14a of the glass base body 14. A surface 35a on the vehicle exterior side of a portion projecting radially outward of the second flange part 35 is bonded to the surface 18B of the light blocking layer 18. That is, the frame member 30 is fixed to the glass base body 10 (glass base bodies 12 and 14) with the outer peripheral surface 31b, the surface 34b, the surface 36b, the outer peripheral surface 32a, and the surface 35a. More specifically, a bonding agent is applied to the outer peripheral surface 31b, the surface 34b, the surface 36b, the outer peripheral surface 32a, and the surface 35a to hold the glass base body 10. With this configuration, the peripheral part of the far-infrared ray transmission member 20, the wall part 36, and the peripheral part facing the opening 19 of the glass base body 14 are disposed overlapping each other in the Z-direction.

A peripheral part on a radially inward of the first flange part 34 is positioned at the same position in a radial direction as a peripheral part on a radially inner side of the second flange part 35, or positioned on an outer side thereof. A peripheral part on a radially outward of the first flange part 34 is positioned on an outer side of a peripheral part on a radially outer side of the second flange part 35.

A surface 34c on the vehicle exterior side of the portion projecting radially inward of the first flange part 34 has a tilt angle θ1 with respect to the surface 34a on the vehicle interior side. A surface 34d on the vehicle exterior side of the portion projecting radially outward of the first flange part 34 has a tilt angle θ2 with respect to the surface 34b on the vehicle interior side. The tilt angle θ1 is larger than the tilt angle θ2. By tilting the surface 34c and the surface 34b of the first flange part 34, it is possible to suppress the possibility that the wiping effect of the wipers is deteriorated or the load on the wipers is increased, for example.

As illustrated in FIG. 5, regarding the frame member 30, the length of the longest straight line among straight lines each connecting optional two points on an inner circumference on a side facing the opening 19 in a surface on the vehicle exterior side (inner diameter) is called D, and a thickness of a part projecting toward the vehicle exterior side from the surface on the vehicle exterior side of the glass base body 10 (herein, the surface 12A) is called t. In this case, it is preferable that $D^2/t$ is larger than 1250, and t is equal to or smaller than 2.5 mm. More preferably, $D^2/t$ is equal to or larger than 1400, and t is equal to or smaller than 1.5 mm. Particularly preferably, $D^2/t$ is equal to or larger than 2000, and t is equal to or smaller than 1.0 mm. The inner diameter D is an inner diameter on the vehicle exterior side of the frame member 30, in other words, an inner diameter of the first flange part 34. The thickness t is a thickness of the first flange part 34, in other words, a thickness from the surface 12A of the glass base body 12 to a top part 34e of the first flange part 34. By causing the inner diameter D and the thickness t of the frame member 30 to fall within this range, it is possible to suppress the possibility that the wiping effect of the wipers is deteriorated or the load on the wipers is increased, for example. Herein, the inner diameter D indicates a length in a state in which the glass 1 for vehicles is mounted on the vehicle V. For example, in a case of performing bending processing on the glass to have a shape to be mounted on the vehicle V, the inner diameter D is a length in a state after the bending processing is performed. The same applies to the description about dimensions or positions other than the inner diameter D unless otherwise noted. The frame member 30 is not limited to an integral-type. For example, the cylindrical part 33, the first flange part 34, and the second flange part 35 may be divided into a plurality of pieces as needed, for example, into two or three pieces in view of a resin molding property and cost. The configuration may be further simplified such that a plurality of (for example, two or three) O-rings having different diameters are caused to have functions of the cylindrical part 33, the first flange part 34, and the second flange part 35, respectively. In a case in which the glass 1 for vehicles is not laminated glass, the frame member 30 may be tapered so that the area thereof is reduced from the vehicle exterior side toward the vehicle interior side.

The inner diameter D is preferably equal to or larger than 18 mm and equal to or smaller than 76 mm, more preferably equal to or larger than 25 mm and equal to or smaller than 70 mm, and even more preferably equal to or larger than 30 mm and equal to or smaller than 60 mm. By causing the inner diameter D to fall within this range, a covered area of the far-infrared ray transmission member 20 can be kept in an appropriate range. An outer diameter DL is assumed to be a length of the longest straight line among straight lines each connecting optional two points on an outer circumference on a side facing the opening 19 in a surface on the vehicle exterior side of the frame member 30 (outer diameter). In this case, the outer diameter DL is preferably equal to or larger than 22 mm and equal to or smaller than 100 mm, more preferably equal to or larger than 29 mm and equal to or smaller than 94 mm, and even more preferably equal to or larger than 34 mm and equal to or smaller than 84 mm. By causing the outer diameter DL to fall within this range, the width of the frame member 30 can be prevented from being excessively increased.

As illustrated in FIG. 6 and FIG. 7, at least equal to or larger than one groove is preferably formed on the surface on the vehicle exterior side of the frame member 30. In the present embodiment, a groove 37 and a groove 38 are formed on a surface on the vehicle exterior side of the first flange part 34. The groove 37 and the groove 38 are formed along a radial direction of the first flange part 34. The groove 37 and the groove 38 are disposed in a wiping range of the wipers at the time when the wipers of the vehicle V operate. In the present embodiment, the groove 38 is disposed on a lower part of the first flange part 34. In the present embodiment, the groove 37 is disposed at a position shifted from the groove 38 by about 45° in a circumferential direction of the first flange part 34. The groove 37 and the groove 38 disposed as described above smoothly discharge water accumulated on a radially inward of the frame member 30 on the surface on the vehicle exterior side of the frame member 30 to the outside of the frame member 30.

The frame member 30 is preferably made of a black synthetic resin material, for example, an ABS resin, polypropylene (PP), polycarbonate (PC), modified polyphenylene ether (PPE), polyvinyl chloride (PVC), polyamide such as PA6 and PA66, a rubber material, for example, butyl rubber (IIR), ethylene/propylene rubber (EPDM), chloroprene rubber (CR), thermoplastic elastomer (TPE), or a composite material thereof. The frame member 30 is preferably a synthetic resin material having ultraviolet ray resistance, a rubber material, or a composite material thereof.

(Far-Infrared Ray Transmission Region)

Next, the following describes the far-infrared ray transmission region B. As illustrated in FIG. 2, the far-infrared ray transmission region B is formed in the vicinity of the upper edge part 1a of the glass 1 for vehicles in the Y-direction, and in the vicinity of the center of the glass 1 for vehicles in the X-direction. The opening 19 and the far-infrared ray transmission member 20 are formed in the vicinity of the upper edge part 1a of the glass 1 for vehicles in the Y-direction, and in the vicinity of the center of the glass 1 for vehicles in the X-direction.

As illustrated in FIG. 3, regarding the far-infrared ray transmission member 20 in the far-infrared ray transmission region B, a length DA of the longest straight line among straight lines each connecting optional two points in the surface on the vehicle exterior side is equal to or smaller than 80 mm. The length DA is preferably equal to or smaller than 70 mm, more preferably equal to or smaller than 65 mm, and even more preferably equal to or smaller than 50 mm. The length DA is preferably equal to or larger than 25 mm, more preferably equal to or larger than 30 mm, and even more preferably equal to or larger than 35 mm. It can also be said that the length DA is a length of the longest straight line among straight lines each connecting optional two points on the inner circumference of the first holding part 31 of the frame member 30 on the same plane parallel with the Z-direction (that is, the inner diameter of the first holding part 31). Regarding the opening 19 in the far-infrared ray transmission region B, a length DB of the longest straight line among straight lines each connecting optional two points in the surface on the vehicle exterior side is preferably equal to or smaller than 80 mm. The length DB is preferably equal to or smaller than 70 mm, more preferably equal to or smaller than 65 mm, and even more preferably equal to or smaller than 50 mm. The length DB is preferably equal to or larger than 25 mm, more preferably equal to or larger than 30 mm, and even more preferably equal to or larger than 35 mm. It can also be said that the length DB is the length of the longest straight line among straight lines each connecting optional two points on the outer circumference of the opening 19 on the surface on the vehicle exterior side (surface 12A) of the glass 1 for vehicles. It can also be said that the length DB is a length of the longest straight line among straight lines each connecting optional two points on the outer circumference of the first holding part 31 of the frame member 30 on the same plane parallel with the Z-direction (that is, the outer diameter of the first holding part 31). By causing the length DA of the far-infrared ray transmission member 20 and the length DB of the opening 19 to fall within the range described above, the strength of the glass 1 for vehicles can be prevented from being lowered, and a perspective distortion amount in the periphery of the opening 19 can be suppressed while maintaining image quality of the far-infrared camera. Considering expansion of respective materials within a usage temperature range, the lengths DA and DB are appropriately determined not to cause distortion. As a measure for preventing distortion due to expansion, a gap may be disposed in advance. Each of the lengths DA and DB is a length corresponding to a diameter of the surface on the vehicle exterior side in a case in which the surface on the vehicle exterior side of the far-infrared ray transmission member 20 has a circular shape. Herein, each of the lengths DA and DB indicates a length in a state in which the glass 1 for vehicles is mounted on the vehicle V. For example, in a case of performing bending processing on the glass to have a shape to be mounted on the vehicle V, each of the lengths DA and DB is a length in a state after the bending processing is performed. The same applies to the description about dimensions or positions other than the lengths DA and DB unless otherwise noted.

(Visible Light Transmission Region)

Next, the following describes the visible light transmission region C. As illustrated in FIG. 2, the visible light transmission region C is preferably disposed in the vicinity of the far-infrared ray transmission region B. Specifically, the center of the far-infrared ray transmission region B viewed from the Z-direction is assumed to be a center point OB, and the center of the visible light transmission region C viewed from the Z-direction is assumed to be a center point OC. Where the shortest distance between the far-infrared ray transmission region B (opening 19) and the visible light transmission region C when viewed from the Z-direction is a distance L, the distance L is preferably larger than 0 mm and equal to or smaller than 100 mm, and is more preferably equal to or larger than 10 mm and equal to or smaller than 80 mm. By positioning the visible light transmission region C in the range described above with respect to the far-infrared ray transmission region B, the perspective distortion amount in the visible light transmission region C can be suppressed and an image can be appropriately taken by the visible light camera CA2 while enabling the far-infrared camera CA1 and the visible light camera CA2 to take images at close positions. By taking images at close positions by the far-infrared camera CA1 and the visible light camera CA2, a load for performing arithmetic processing on data obtained from each of the cameras is reduced, and a power supply and a signal cable can be preferably handled.

Returning to FIG. 2, the visible light transmission region C and the far-infrared ray transmission region B are preferably positioned side by side in the X-direction. That is, it is preferable that the visible light transmission region C is not positioned on the Y-direction side with respect to the far-infrared ray transmission region B, but is positioned side by side with the far-infrared ray transmission region B in the X-direction. By arranging the visible light transmission region C side by side with the far-infrared ray transmission region B in the X-direction, the visible light transmission region C can be arranged in the vicinity of the upper edge part 1a. Accordingly, the visual field of the driver in the transparent region A1 can be appropriately secured.

Similarly to the far-infrared ray transmission region B, it is preferable that the visible light transmission region C is positioned in the vicinity of the upper edge part 1a in the Y-direction, and positioned in the vicinity of the far-infrared ray transmission region B in the X-direction. By arranging the visible light transmission region C at this position, the perspective distortion amount in the visible light transmission region C can be suppressed and an image can be appropriately taken by the visible light camera CA2 while enabling the far-infrared camera CA1 and the visible light camera CA2 to take images at close positions.

(Configuration of Camera Unit)

Figure 10:
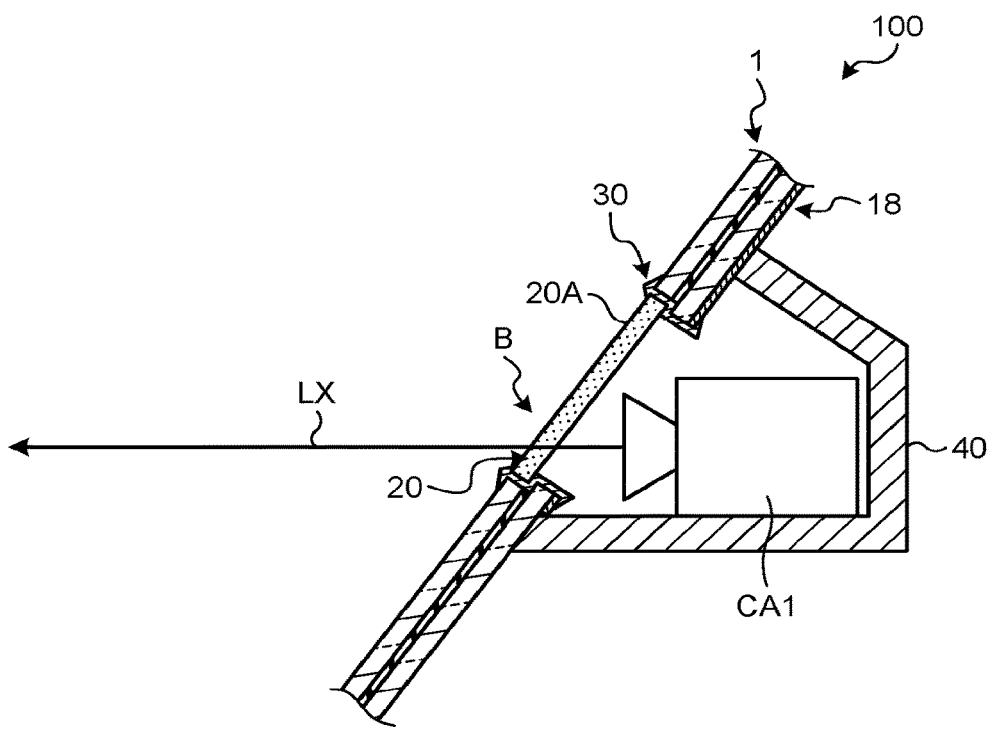
FIG. 10 is a diagram illustrating a configuration example in a case of mounting a far-infrared camera on the glass for vehicles.

Next, the following describes a configuration of the camera unit 100 according to the present embodiment, more specifically, a configuration example in a case of mounting the far-infrared camera CA1 on the glass 1 for vehicles. FIG. 10 is a diagram illustrating the configuration example in a case of mounting the far-infrared camera CA1 on the glass 1 for vehicles.

The camera unit 100 according to the present embodiment includes the glass 1 for vehicles, the far-infrared camera CA1, and the visible light camera CA2. The glass 1 for vehicles has been described above. The far-infrared camera CA1 is mounted on the glass 1 for vehicles so as to be able to take a thermal image of the outside through the far-infrared ray transmission region B of the glass 1 for vehicles. The far-infrared camera CA1 is disposed at a position opposed to the far-infrared ray transmission region B inside the vehicle V (within the vehicle). A type of the far-infrared camera CA1 is not particularly limited, and a known far-infrared camera can be used. As illustrated in FIG. 10, the far-infrared camera CA1 is mounted on the glass 1 for vehicles with a bracket 40, for example. The far-infrared camera CA1 is normally mounted so that an optical axis LX becomes substantially horizontal.

The visible light camera CA2 is mounted on the glass 1 for vehicles so as to be able to take an image of the outside through the visible light transmission region C of the glass 1 for vehicles. The visible light camera CA2 is disposed at a position opposed to the visible light transmission region C inside the vehicle V (within the vehicle). The visible light camera CA2 is preferably mounted so that the optical axis LX of the far-infrared camera CA1 is substantially parallel with an optical axis of the visible light camera CA2. "Substantially parallel" is a concept including not only a case in which these optical axes are completely parallel with each other but also a case in which these optical axes slightly deviate from parallel positions as an allowable error. With such a configuration, the optical axis LX of the far-infrared camera CA1 substantially agrees with the center of the visual field of the visible light camera CA2, which is preferable at the time of performing information processing by combining images obtained from these cameras.

(Manufacturing Method for Glass for Vehicles)

Figure 11:
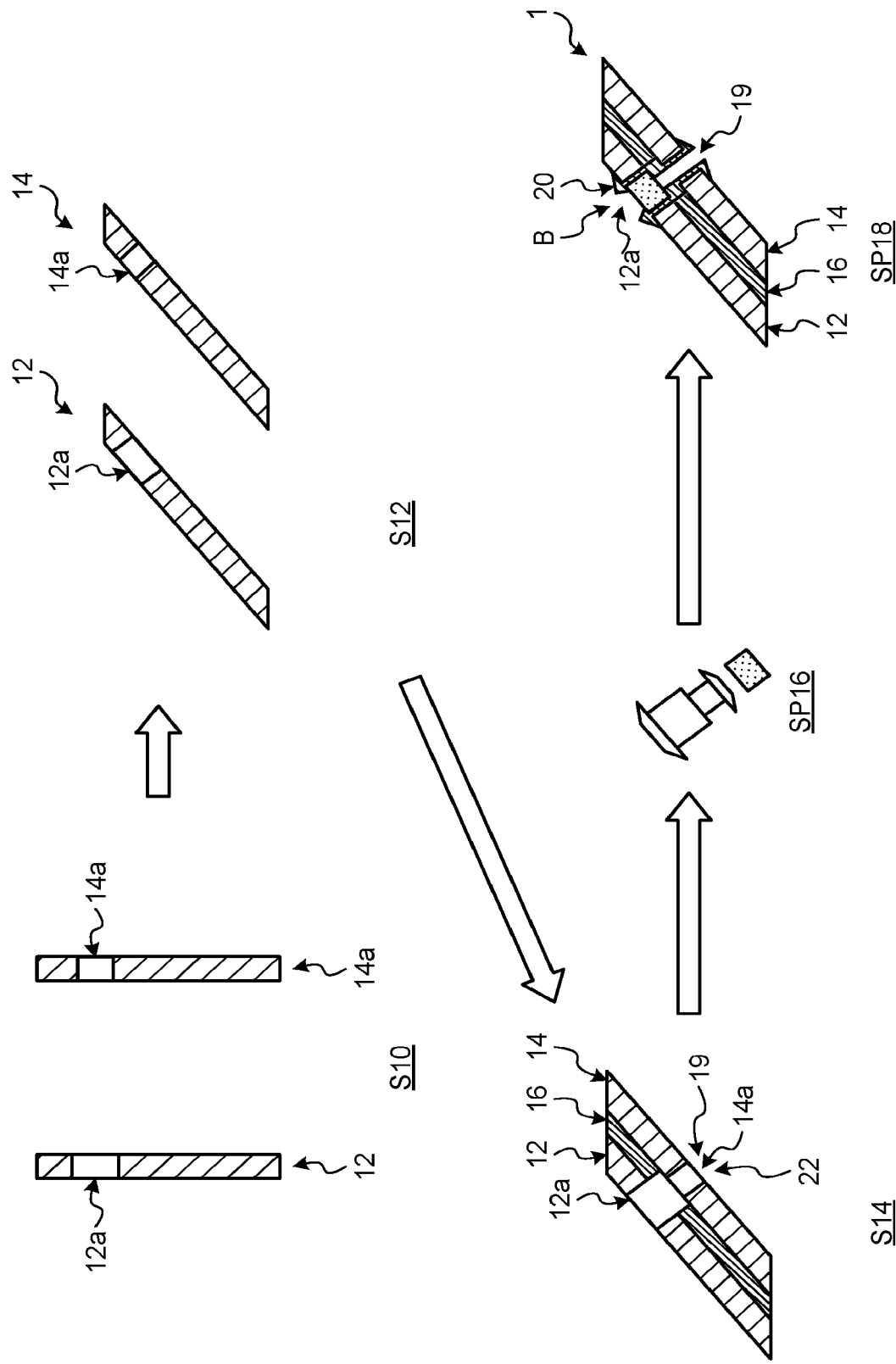
FIG. 11 is a schematic diagram for explaining an example of a manufacturing method for the glass for vehicles according to the first embodiment.

A manufacturing method for the glass 1 for vehicles is not particularly limited, but the following describes an example thereof. FIG. 11 is a schematic diagram for explaining an example of the manufacturing method for the glass 1 for vehicles according to the first embodiment. As exemplified in FIG. 11, in a case of manufacturing the glass 1 for vehicles, the glass base bodies 12 and 14 having a flat-plate shape are prepared, and the openings 12a and 14a are formed thereon (Step S10). Each of the glass base bodies 12 and 14 having a flat-plate shape on which the openings 12a and 14a are formed is subjected to bending processing (Step S12) to have a shape matching the windshield of the vehicle V. The glass base body 12 and the glass base body 14 subjected to the bending processing are bonded to each other with the intermediate layer 16 interposed therebetween to be laminated glass (Step S14). In this case, the glass base body 12 is bonded to the glass base body 14 so that the opening 12a communicates with the opening 14a and the intermediate layer 16 is not formed at a communicating point thereof. After being the laminated glass, only a portion of the intermediate layer 16 overlapping the opening 12a and the opening 14a may be removed by using a thermal/chemical method to make communication. Due to this, the opening 12a communicates with the opening 14a, and the opening 19 is formed. The frame member 30 is then assembled to the peripheral part of the far-infrared ray transmission member 20 (Step S16). At this point, a bonding agent is applied to a peripheral surface of the first holding part 31. The far-infrared ray transmission member 20 is held by the first holding part 31. The far-infrared ray transmission member 20 to which the frame member 30 is assembled is disposed in the opening 19 (Step S18), and the glass 1 for vehicles is completely manufactured. At this point, the bonding agent is applied to a peripheral surface of the second holding part 32. The glass base body 10 is held by the second holding part 32. Additionally, the light blocking layer 18 may be formed. The light blocking layer 18 may be formed at any step from Step S10 to Step S18, for example, may be formed before the bending processing.

(Effects)

As described above, in the present embodiment, the glass 1 for vehicles includes the glass base body 10 and the light blocking region A2. The glass 1 for vehicles includes the light blocking region A2 in which the far-infrared ray transmission region B is formed, the far-infrared ray transmission region B provided with the opening 19 formed on the glass base body 10 and the far-infrared ray transmission member 20 arranged in the opening 19. In the present embodiment, the glass base body 10 and the far-infrared ray transmission member 20 are bonded to each other with the frame member 30 interposed therebetween. In the present embodiment, regarding the frame member 30, where the length of the longest straight line among straight lines each connecting optional two points on the inner circumference on a side facing the opening 19 in the surface on the vehicle exterior side is D, and the thickness of a part projecting from the surface on the vehicle exterior side of the glass base body 10 is t, $D^2/t$ is larger than 1250, and t is equal to or smaller than 2.5 mm. According to the present embodiment, the frame member 30 does not excessively project toward the vehicle exterior side, so that it is possible to suppress deterioration in the wiping property of the wipers and increase in the load on the wipers. According to the present embodiment, the frame member 30 does not excessively project toward the vehicle exterior side, so that it is possible to prevent the design of the vehicle V from being deteriorated, and prevent dust or the like from accumulating on the level difference between the frame member 30 and each of the glass 1 for vehicles and the far-infrared ray transmission member 20.

In the present embodiment, the frame member 30 is disposed to cover the boundary between the glass 1 for vehicles and the far-infrared ray transmission member 20 on the vehicle exterior side. In the present embodiment, the far-infrared ray transmission member 20 is held by the bonding agent applied to the peripheral surface of the first holding part 31. In the present embodiment, the glass base body 10 is held by the bonding agent applied to the peripheral surface of the second holding part 32. In the present embodiment, the peripheral part of the far-infrared ray transmission member 20, the wall part 36, and the peripheral part facing the opening 19 of the glass base body 14 are disposed overlapping each other in the Z-direction. According to the present embodiment, it is possible to prevent dirt and foreign substances such as sand and dust from entering the vehicle interior side through the boundary between the frame member 30 and each of the glass 1 for vehicles and the far-infrared ray transmission member 20. According to the present embodiment, a high soil resistance effect can be obtained. According to the present embodiment, it is possible to suppress lowering of a sound insulation property at the boundary between the frame member 30 and each of the glass 1 for vehicles and the far-infrared ray transmission member 20. According to the present embodiment, it is possible to control the bonding agent that bonds the frame member 30 to each of the glass 1 for vehicles and the far-infrared ray transmission member 20 not to be exposed to the vehicle exterior side and the vehicle interior side. According to the present embodiment, the bonding agent can be protected from the external environment.

In the present embodiment, the glass 1 for vehicles includes the glass base body 12 (first glass base body) and the glass base body 14 (second glass base body) that is disposed closer to the vehicle interior side than the glass base body 12 and opposed to the glass base body 12, and the opening 12*a* of the glass base body 12 communicates with the opening 14*a* of the glass base body 14 to form the opening 19. The far-infrared ray transmission member 20 is disposed in the opening 12*a* of the glass base body 12. The frame member 30 includes the cylindrical part 33 disposed in the opening 19, and the cylindrical part 33 includes the first holding part 31 and the second holding part 32. The first holding part 31 is disposed between the far-infrared ray transmission member 20 and the inner peripheral surface of the opening 12*a* of the glass base body 12. The second holding part 32 is disposed in the opening 14*a* of the glass base body 14. In the present embodiment, the glass base body 12 and the far-infrared ray transmission member 20 can be appropriately held by the first holding part 31 and the second holding part 32.

In the present embodiment, the cylindrical part 33 is formed in a stepped shape such that the inner diameter of the second holding part 32 is smaller than the inner diameter of the first holding part 31. In the present embodiment, the frame member 30 has such a stepped shape, so that it is possible to prevent water from entering the inner part.

In the present embodiment, the peripheral part of the surface 20B of the far-infrared ray transmission member 20 is held by the surface 36*a* of the wall part 36. According to the present embodiment, the strength against impact from the vehicle exterior side can be prevented from being lowered.

In the present embodiment, at least equal to or larger than one groove, for example, the groove 37 and the groove 38 are formed on the surface on the vehicle exterior side of the frame member 30. According to the present embodiment, water accumulated on the radially inward on the surface on the vehicle exterior side of the frame member 30 can be smoothly discharged to the outside.

In the present embodiment, the frame member 30 is made of a black material. According to the present embodiment, it is possible to prevent the frame member 30 disposed in the light blocking region A2*a* from being conspicuous when visually recognized from the vehicle exterior side. According to the present embodiment, external appearance and the design of the glass 1 for vehicles can be maintained.

The frame member 30 according to the present embodiment bonds the glass base body 10 to the far-infrared ray transmission member 20 that is disposed in the opening 19 formed on the glass base body 10 of the glass 1 for vehicles. The frame member 30 includes the first holding part 31, the second holding part 32 that is disposed to be continuous to the first holding part 31 and has the inner diameter smaller than the inner diameter of the first holding part 31, and the flange part (first flange part 34) that is disposed on the first holding part 31 on a side opposite to the side on which the second holding part 32 is disposed. Where the length of the longest straight line among straight lines each connecting optional two points on the inner circumference of the flange part (first flange part 34) is D, and the thickness of the flange part (first flange part 34) is t, $D^2/t$ is larger than 1250, and t is equal to or smaller than 2.5 mm. When the frame member 30 is attached to the glass 1 for vehicles, it is possible to suppress deterioration in the wiping property of the wipers and increase in the load on the wipers.

EXAMPLES

The following specifically describes the present invention with examples, but the present invention is not limited thereto. The following describes examples of evaluating the wiping property and the load on the wipers.
(Preparation of Frame Member)

As illustrated in Table 1, prepared were frame members 30 having different inner diameters D, outer diameters DL, and thicknesses t. The inner diameter D is the length of the longest straight line among straight lines each connecting optional two points on the peripheral part facing the opening 19 in the surface on the vehicle exterior side of the frame member 30. The outer diameter DL is the length of the longest straight line among straight lines each connecting optional two points in the surface on the vehicle exterior side of the frame member 30. The following evaluation was performed by using the glass 1 for vehicles in which the far-infrared ray transmission member 20 including the frame member 30 disposed on the peripheral part thereof was disposed in the opening 19, which was prepared as described above.
(Evaluation of Wiping Property)

In evaluation of the wiping property, circular seals (made of PVC, adhesive: acrylic-based) having a thickness of 0.25 mm and a desired inner diameter D and outer diameter DL were prepared, and the thickness was caused to be variable from 0.25 to 3.0 mm by overlapping the seals. After cleaning an outer surface of front glass and wiping off water from the outer surface to be well dried, the seal was attached to, from an outer side, and well pressed against a part in which the camera was assumed to be installed in a wiper operating range, and 5 minutes of standby time elapsed.

Next, by using a shower head on which a hole of 0.0 mm is made, the wipers were reciprocated at a speed of 1 time/second while splashing water on the windshield assuming precipitation of about 5 mm/h, and video was taken for about 2 minutes focusing on an inner side of the circular seal from the driver's seat within the compartment. At this point, "pass: ○" was determined when the water on the inner side was wiped off, and "failure: x" was determined when a water film occupied the entire inner side or 30% or more of the entire area. The used wipers have a width of 5 mm and a length of 700 mm on the driver's seat side, and have a width of 5 mm and a length of 375 mm on a passenger seat side.
(Evaluation of Load on Wipers)

In evaluation of the load on the wipers, at the time of evaluating the wiping property described above, "pass: ○" was determined in a case in which the wipers did not vibrate and no strange sound was generated, and "failure: x" was determined in a case in which the wipers vibrated or a strange sound was generated.

In an example 1, the inner diameter D was 25 mm, the outer diameter DL was 36 mm, the thickness t was 0.25 mm, and $D^2/t$ was 2500.

In an example 2, the inner diameter D was 25 mm, the outer diameter DL was 36 mm, the thickness t was 0.5 mm, and $D^2/t$ was 1250.

In an example 3, the inner diameter D was 25 mm, the outer diameter DL was 36 mm, the thickness t was 1.0 mm, and $D^2/t$ was 625.

In an example 4, the inner diameter D was 36 mm, the outer diameter DL was 50 mm, the thickness t was 0.25 mm, and $D^2/t$ was 5184.

In an example 5, the inner diameter D was 36 mm, the outer diameter DL was 50 mm, the thickness t was 0.5 mm, and $D^2/t$ was 2592.

In an example 6, the inner diameter D was 36 mm, the outer diameter DL was 50 mm, the thickness t was 1.0 mm, and $D^2/t$ was 1296.

In an example 7, the inner diameter D was 46 mm, the outer diameter DL was 60 mm, the thickness t was 0.5 mm, and $D^2/t$ was 4232.

In an example 8, the inner diameter D was 46 mm, the outer diameter DL was 60 mm, the thickness t was 1.0 mm, and $D^2/t$ was 2116.

In an example 9, the inner diameter D was 46 mm, the outer diameter DL was 60 mm, the thickness t was 1.5 mm, and $D^2/t$ was 1410.667.

In an example 10, the inner diameter D was 46 mm, the outer diameter DL was 60 mm, the thickness t was 3.0 mm, and $D^2/t$ was 705.3333.

TABLE 1

| | Inner diameter D (outer diameter DL) [mm] | Thickness t [mm] | $D^2/t$ | Wiping property | Load on wipers |
|---|---|---|---|---|---|
| Example 1 | 25 (36) | 0.25 | 2500 | ○ | ○ |
| Example 2 | 25 (36) | 0.5 | 1250 | x | ○ |
| Example 3 | 25 (36) | 1.0 | 625 | x | ○ |
| Example 4 | 36 (50) | 0.25 | 5184 | ○ | ○ |
| Example 5 | 36 (50) | 0.5 | 2592 | ○ | ○ |
| Example 6 | 36 (50) | 1.0 | 1296 | ○ | ○ |
| Example 7 | 46 (60) | 0.5 | 4232 | ○ | ○ |
| Example 8 | 46 (60) | 1.0 | 2116 | ○ | ○ |
| Example 9 | 46 (60) | 1.5 | 1410.667 | ○ | ○ |
| Example 10 | 46 (60) | 3.0 | 705.3333 | x | x |

The following describes results of evaluation of the wiping property for each example.

The results of the example 1 and the example 4 to the example 9 were "pass: ○", which were preferable results. In the example 1 and the example 4 to the example 9, $D^2/t$ is larger than 1250.

The results of the example 2, the example 3, and the example 10 were "failure: x", which were not preferable results. In the example 2, the example 3, and the example 10, $D^2/t$ is equal to or smaller than 1250.

The following describes results of evaluation of the load on the wipers for each example.

The results of the example 1 to example 9 were "pass: ○", which were preferable results. In the example 1 to the example 9, the thickness t is equal to or smaller than 1.5 mm.

The result of the example 10 was "failure: x", which was not a preferable result. In the example 10, the thickness t is larger than 1.5 mm.

As is clear from the above results, when $D^2/t$ is larger than 1250, deterioration in the wiping property can be suppressed. When the thickness t is equal to or smaller than 1.5 mm, the load on the wipers can be suppressed.

Second Embodiment

Next, the following describes a second embodiment. The second embodiment is different from the first embodiment in that a frame member 30A is constituted of a plurality of members.

Figure 12:
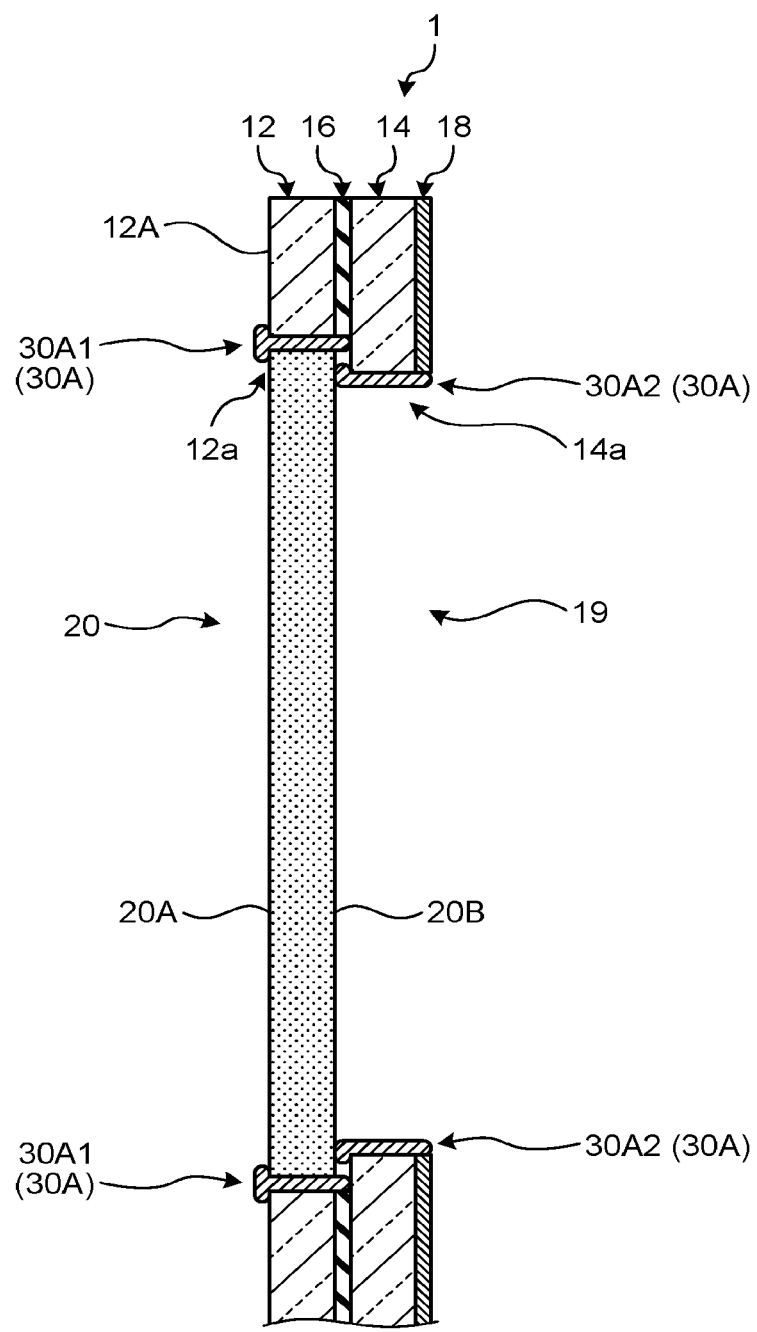
FIG. 12 is an enlarged cross-sectional view of the periphery of the far-infrared ray transmission region of the glass for vehicles according to a second embodiment.

FIG. 12 is a schematic diagram of a frame member according to the second embodiment. As illustrated in FIG. 12, the frame member 30A according to the second embodiment includes a first frame member 30A1 and a second frame member 30A2. The first frame member 30A1 and the second frame member 30A2 are O-rings in this example. The first frame member 30A1 is disposed between an outer peripheral surface of the far-infrared ray transmission member 20 and an inner peripheral surface of the opening 12a of the glass base body 12. The first frame member 30A1 is filled between the outer peripheral surface of the far-infrared ray transmission member 20 and the inner peripheral surface of the glass base body 12 to seal between the outer peripheral surface of the far-infrared ray transmission member 20 and the inner peripheral surface of the glass base body 12. That is, it can be said that the first frame member 30A1 has the function of the first holding part 31 in the first embodiment. The first frame member 30A1 projects toward the vehicle exterior side from between the outer peripheral surface of the far-infrared ray transmission member 20 and the inner peripheral surface of the glass base body 12, and covers a boundary between the far-infrared ray transmission member 20 and the glass base body 12 on the surface on the vehicle exterior side of the glass 1 for vehicles. That is, it can be said that the first frame member 30A1 also has the function of the first flange part 34 in addition to the function of the first holding part 31 in the first embodiment.

The second frame member 30A2 is disposed on an inner peripheral surface of the glass base body 14. The second frame member 30A2 seals a space between the glass base body 12 and the glass base body 14, that is, a space on a radially inward of the intermediate layer 16. That is, it can be said that the second frame member 30A2 has the function of the second holding part 32 in the first embodiment.

The frame member 30A may also be constituted of three or more members. For example, in a case in which the frame member 30A is constituted of three members, the frame member 30 may have a configuration in which an O-ring is interposed between the first frame member 30A1 and the second frame member 30A2. In this case, the O-ring may also have the function of the second holding part 32 in the first embodiment. In this case, the O-ring is required to have a water cut-off property, so that a material of the O-ring is preferably a rubber material, or a composite material of a synthetic resin and rubber. A material of the first frame member 30A1 and the second frame member 30A2 may be a synthetic resin material having ultraviolet ray resistance described above, a rubber material, a composite material thereof, or a metallic material such as stainless steel.

By using the frame member 30A constituted of a plurality of members as described above, it is possible to suppress deterioration in the wiping property of the wipers and increase in the load on the wipers. The shape of the frame member is not limited to the examples in the first embodiment and the second embodiment.

The embodiment of the present invention has been described above, but the embodiment is not limited thereto. The constituent elements described above include a constituent element that is easily conceivable by those skilled in the art, substantially the same constituent element, and what is called an equivalent. Furthermore, the constituent elements described above can be appropriately combined. In addition, the constituent elements can be variously omitted, replaced, or modified without departing from the gist of the embodiments described above.

REFERENCE SIGNS LIST

1 GLASS FOR VEHICLES
1a UPPER EDGE PART
1b LOWER EDGE PART
1c, 1d SIDE EDGE PART
10, 12, 14 GLASS BASE BODY
16 INTERMEDIATE LAYER
18 LIGHT BLOCKING LAYER
19 OPENING
20 FAR-INFRARED RAY TRANSMISSION MEMBER
30 FRAME MEMBER
33 CYLINDRICAL PART
34 FIRST FLANGE PART
35 SECOND FLANGE PART
40 BRACKET
100 CAMERA UNIT
A1 TRANSPARENT REGION
A2 LIGHT BLOCKING REGION
B FAR-INFRARED RAY TRANSMISSION REGION
C VISIBLE LIGHT TRANSMISSION REGION
CA1 FAR-INFRARED CAMERA
CA2 VISIBLE LIGHT CAMERA
D INNER DIAMETER
t THICKNESS
V VEHICLE

The invention claimed is:

1. A glass for vehicles comprising a glass base body and including a light blocking region, wherein
    a far-infrared ray transmission region is formed in the light blocking region, the far-infrared ray transmission region being provided with an opening formed on the glass base body and a far-infrared ray transmission member disposed in the opening,
    the glass base body and the far-infrared ray transmission member are bonded to each other with a frame member interposed therebetween, and,
    regarding the frame member, where a length of a longest straight line among straight lines each connecting optional two points on an inner circumference on a side facing the opening in a surface on a vehicle exterior side is D, and a thickness of a portion projecting from a surface on a vehicle exterior side of the glass base body is t,
    $D^2/t$ is larger than 1250 and t is equal to or smaller than 2.5 mm.

2. The glass for vehicles according to claim 1, wherein the frame member is disposed to cover a boundary between the glass base body and the far-infrared ray transmission member on the vehicle exterior side.

3. The glass for vehicles according to claim 1, wherein
    the glass for vehicles includes a first glass base body and a second glass base body that is disposed closer to a vehicle interior side than the first glass base body and opposed to the first glass base body, an opening of the first glass base body and an opening of the second glass base body communicate with each other to form the opening,
    the far-infrared ray transmission member is disposed in the opening of the first glass base body, and
    the frame member includes a cylindrical part disposed in the opening, and the cylindrical part includes a first holding part disposed between the far-infrared ray transmission member and an inner peripheral surface of the opening of the first glass base body and a second holding part disposed in the opening of the second glass base body.

4. The glass for vehicles according to claim 3, wherein the cylindrical part is formed in a stepped shape such that an inner diameter of the second holding part is smaller than an inner diameter of the first holding part.

5. The glass for vehicles according to claim 1, wherein at least equal to or larger than one groove is formed on a surface on the vehicle exterior side of the frame member.

6. The glass for vehicles according to claim 1, wherein the frame member is black.

7. The glass for vehicles according to claim 1, wherein a length of the longest straight line among straight lines each connecting optional two points in a surface on the vehicle exterior side of the far-infrared ray transmission member is equal to or smaller than 80 mm.

8. The glass for vehicles according to claim 1, wherein an average thickness of the far-infrared ray transmission member is equal to or larger than 1.5 mm.

9. A manufacturing method for the glass for vehicles according to claim 1, the manufacturing method comprising:
bonding two glass base bodies to each other with an intermediate layer interposed therebetween to be a laminated glass including the opening passing through the laminated glass in a thickness direction;
assembling the frame member to a peripheral part of the far-infrared ray transmission member; and
disposing the far-infrared ray transmission member to which the frame member is assembled in the opening.

10. A frame member configured to bond a far-infrared ray transmission member disposed in an opening formed on a glass base body of glass for vehicles to the glass base body, the frame member comprising:
a first holding part;
a second holding part that is disposed to be continuous to the first holding part, and has an inner diameter smaller than an inner diameter of the first holding part; and
a flange part disposed on the first holding part on a side opposite to a side on which the second holding part is disposed, wherein,
where a length of a longest straight line among straight lines each connecting optional two points on an inner circumference of the flange part is D, and a thickness of the flange part is t, $D^2/t$ is larger than 1250 and t is equal to or smaller than 2.5 mm.

* * * * *